Dec. 2, 1969 TADASHI KUME 3,482,054

OFFICE DEVICE FOR IDENTIFYING NUMBER OF MALICIOUS CALLER'S TELEPHONE STATION

Filed May 2, 1966

Tadashi Kume
Inventor

By, Wenderoth, Lind & Ponack
Attorneys 3,482,054
Patented Dec. 2, 1969

3,482,054

OFFICE DEVICE FOR IDENTIFYING NUMBER OF MALICIOUS CALLER'S TELEPHONE STATION

Tadashi Kume, Nagasaki, Japan, assignor to Mitsubishi Seiko Kabushiki Kaisha, Tokyo, Japan Filed May 2, 1966, Ser. No. 546,655
Int. Cl. H04m 3/22
U.S. Cl. 179—18 4 Claims

ABSTRACT OF THE DISCLOSURE

An identification device connected in the central office to the line circuits of all telephones that may need to be identified. During a malicious call, the called party can dial a predetermined digit while still on-line, and an alarm and an indicator lamp will activate in the central office. The lamp, which is individual to the calling line, will stay on even though the caller hangs up, as long as the called party stays off-hook.

This invention relates in general to an office device for identifying the number of a caller's telephone station in an automatic telephone system and more particularly to an identification device in an automatic telephone exchange office for informing an operator in the office of the number of a telephone station in which a person is maliciously or threateningly telephoning a called person.

During a malicious or threatening transmission over the telephone, there has heretofore been required both considerable time and a large amount of labor to identify the number of that telephone station from which such transmission originates. Further after the completion of the transmission it has never been possible to identify the number of the telephone station to be sought.

It is, accordingly, the primary object of the invention to provide a novel identification device disposed in an automatic telephone exchange office to identify the number of a caller's telephone station in a relatively short time interval such as a few seconds and in a simple manner.

It is another object of the invention to provide a novel identification device as described in the preceding paragraph capable of identifying such a number after the caller has stopped his transmission and as long as the called telephone station is in its operative position.

According to the invention, there is provided an identification device in an automatic telephone exchange office for identifying the number of a caller's telephone station wherein when a called party has dialed a predetermined digit such as "1" on his selection dial while maintaining his transmitter and receiver unit disengaged from its cradle or hook, an alarm disposed in the exchange office is energized and at the same time an indicator lamp corresponding to the number of the caller's telephone station is turned on within a time interval of a few seconds, resulting in identification of the number to be sought. Even after a caller has stopped a transmission, the alarm and the indicator lamp are in their energized state as long as the called transmitter and receiver unit is disengaged from its cradle or hook. This permits the number of a caller's telephone station to be identified even if the duration of transmission is extremely short. Thus after a caller has again engaged his transmitter and receiver unit in its cradle, and if the associated called party dials the digit "1" on the selection dial, the number of the caller's telephone station can be immediately identified by an operator in the exchange office because the called telephone station continues to be connected to the calling telephone station.

Figure 1:
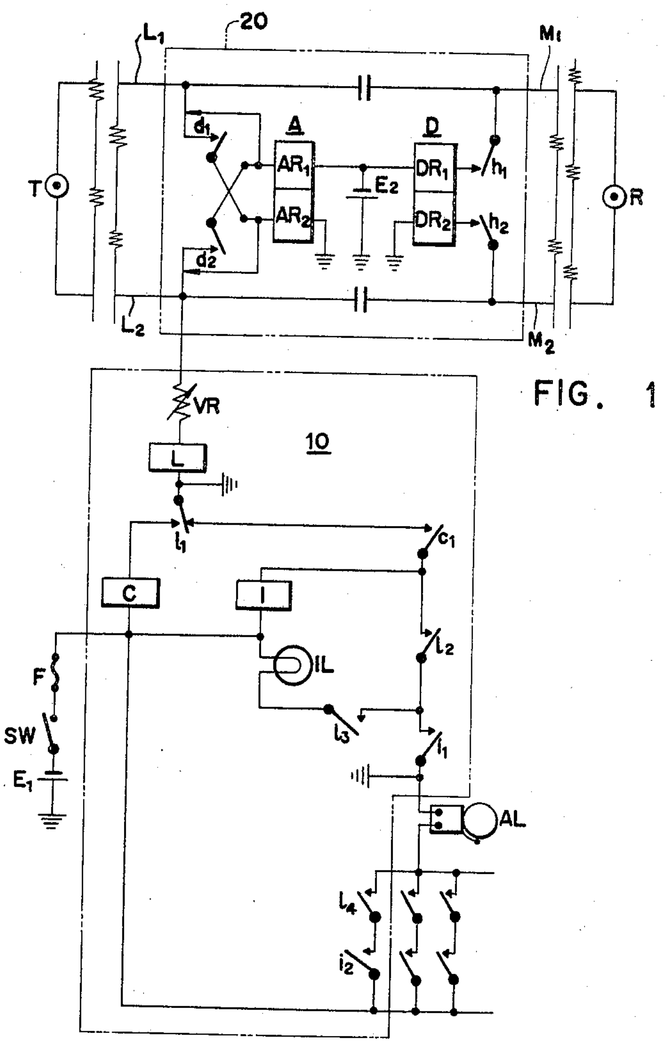
Figure 2:
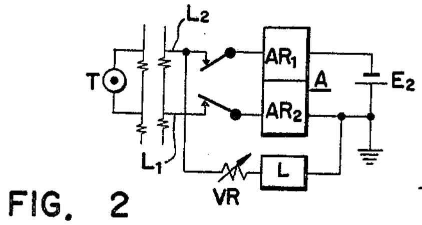

The invention as to its organization and its method of operation as well as other objects and advantages thereof will become apparent from the following detailed description taken in conjunction with the accompanying drawing in which:

FIG. 1 is a schematic circuit diagram of an identification device constructed in accordance with the invention; and FIG. 2 is a fragmental circuit diagram useful for explaining the operation of the invention.

Referring now to the drawing and more particularly to FIG. 1 thereof, there is illustrated an identification device constructed in accordance with the invention. The identification device illustrated is generally designated by the reference numeral 10 and is disposed in an automatic telephone exchange office generally designated by the reference numeral 20, one for each of the telephone stations directly served by that exchange office. The office may be referred to, hereinafter, as a "caller's office" for purpose of explanation. In FIG. 1, the reference character T designates any one of the telephone stations or subscriber sets whose line circuits are connected to the office 20, in this case a caller's telephone station and the reference character R designates a called telephone station or subscriber set.

In FIG. 1, it is to be noted that the dotted block 20 represents only a simplified form of a connector circuit of the conventional construction with the associated line switch and selector circuits deleted for the convenience of illustration. The arrangement in the block 20 does not form a part of the invention and need not be described in detail.

As shown in FIG. 1, the identification device 10 comprises a listener relay L connected to a conductor $L_2$ of a line circuit $L_1$–$L_2$ associated with the calling transmitter and receiver unit T through a variable resistor VR and a slow releasing control relay C adapted to be connected in series to the listener relay L and on a make side of a set of transfer contacts $l_1$ controlled by the latter relay, and having a movable arm connected to the ground. The control relay C is then connected to a source of direct current $E_1$ through a fuse F and a switch SW. Connected to the junction of the control relay C and the fuse F is a slow releasing identification relay I which is, in turn, connected to the break side of the set of transfer contact $l_1$ through a set of make contacts $c_1$ controlled by the control relay C. The above mentioned junction has also an indicator lamp IL for indicating the number of the calling unit T. The lamp IL is connected across the identification relay C through a pair of sets of make contacts $l_3$ and $l_2$ controlled by the listener relay L. The junction of the sets of make contacts $l_3$ and $l_2$ is connected to a set of make contacts $i_1$ controlled by the identification relay I. The set of make contacts $i_1$ is connected to an alarm AL connected to the junction of the relays C and I through two sets of make contacts $l_4$ and $i_2$ disposed in series relationship to each other. The set of make contacts $l_4$ is controlled by the listener relay L and the set of make contacts $i_2$ is controlled by the identification relay I.

The arrangement thus far described is operated as follows:

First the switch SW is closed to supply energy for the operation of the identification device 10. Under these circumstances, it is assumed that after a caller has disengaged his transmitter and receiver unit such as that shown at T in FIG. 1 from its cradle or hook and dialed, he is waiting a response of the associated called party R. This completes a first circuit from a positive or grounded terminal of a source of direct current $E_2$ through one of windings $AR_2$ in a line relay A, contacts $d_2$, the line conductor $L_2$, the calling unit T, a line conductor $L_1$, contacts $d_1$ and the other winding $AR_1$ on the relay A and back to the negative terminal of the source $E_2$, and also completes a second circuit from the positive terminal of the source $E_2$ through the listener relay L, the variable resistor VR, the line conductor $L_2$, the calling unit T, the line conductor $L_1$, the contacts $d_1$, the winding $AR_1$ and back to the negative terminal of the source $E_2$ as shown in FIG. 1.

According to the invention, the variable resistor VR has a value of resistance selected to give the second circuit a higher resistance than the first circuit. That is, the total resistance of the listener relay L and the variable resistor VR is higher than that of the winding $AR_2$. Under these selected circumstances, a substantial portion of current drawn from the source $E_2$ will flow through the first circuit while the second circuit will have only a low flow of current therethrough with the result that the listener relay L is not actuated.

It is now assumed that the associated listener or called party has disengaged his transmitter and receiver unit R from its cradle or hook in response to the call from the caller. This completes a circuit traced from the positive terminal of the source of direct current $E_2$ through one of windings $DR_2$ in a line relay D, contacts $h_2$ controlled by a relay (not shown), a called line conductor $M_2$, the called unit R, a called line conductor $M_1$, contacts $h_1$ controlled by the lastmentioned relay and the other winding $DR_1$ on the relay D and back to the negative terminal of the source $E_2$, whereupon the relay D is energized and picked up to transfer the sets of transfer contacts $d_1$ and $d_2$ that is, to invert the calling line circuit $L_1$, $L_2$. This transfer of the sets of transfer contacts $d_1$ and $d_2$ causes the aforesaid first circuit to be converted into a third circuit from the positive terminal of the source $E_2$ through the winding $AR_2$ on the line relay A, the transferred contacts $d_1$, the calling line conductor $L_1$, the calling unit T, the calling line conductor $L_2$, the transferred contacts $d_2$ and the winding $AR_1$ on the relay A and back to the negative terminal of the source $E_2$. At the same time, the aforesaid second circuit is converted into a fourth circuit from the positive terminal of the source $E_2$ through the winding on the listener relay L, the variable resistor VR, the transferred contacts $d_2$ and the winding $AR_1$ on the line relay A and back to the negative terminal of the source $E_2$. Both the third and fourth circuits are illustrated schematically in FIG. 2. It is to be noted that the fourth circuit has a smaller resistance than the third circuit. In other words, the total resistance of the relay L winding and the resistor VR is less than that of the winding $AR_2$, the line circuits $L_1$, $L_2$ and the calling station T. This permits a substantial portion of a current drawn from the source $E_2$ to flow through the listener relay L thereby to actuate the latter.

When actuated, the listener relay L switches its set of transfer contacts $l_1$, to complete a circuit traced from the grounded or positive terminal of the source of direct current $E_1$ through the switched contacts $l_1$, the relay C winding, the fuse F and the closed switch SW and back to the negative terminal of the source $E_1$ whereby the control relay C is energized. When energized, the control relay C closes the set of make contacts $c_1$. This closure of the contacts $c_1$ has no direct effect upon the operation of the system but energizes the identification relay I for its succeeding operation.

Under these circumstances, it is assumed that the listener being threatened by the caller has dialled a predetermined digit and preferably the digit "1" on his selection dial (not shown), while maintaining the transmitter and receiver unit R disengaged from its cradle or hook. This dialing of the digit "1" effects supply of a pulse to the line circuit $M_1$ and $M_2$ to cause the line relay D to interrupt the third circuit to reset the listener relay L thereby to transfer the movable arm of the set of switch contacts $l$, so they are connected to the set of make contacts $c_1$. In this connection, it is to be noted that as the control relay C is a slow releasing relay, the set of contacts $c_1$ remains closed for a predetermined time after the control relay C has been deenergized due to the dropping out of the listener relay L. Therefore a circuit is completed from the positive terminal of the source E, through the set of transfer contacts $l_1$ in its reset position, the set of still closed contacts $c_1$, the winding of the relay I, the fuse F and the closed switch SW and back to the negative terminal of the source. When energized, the identification relay I closes its sets of make contacts $i_1$ and $i_2$.

At the instant the dialing of digit "1" has been completed, the third circuit is again energized to actuate the listener relay L to again switch the set of transfer contacts $l_1$ to be connected to the relay C. At the same time, the sets of contacts $l_2$, $l_3$ and $l_4$ which were opened at the instant the listener dialed the digit "1" are again closed. This completes an indication circuit from the positive terminal of the source $E_1$ through the set of closed contacts $i_1$, the set of closed contacts $l_3$, the indication lamp IL, the fuse F and the closed switch SW and back to the negative terminal of the source and also an alarm circuit from the positive terminal of the source $E_1$ through the alarm AL, the sets of closed contacts $i_2$ and $l_4$, the fuse F and the closed switch SW and back to the negative terminal of the source. Therefore the indication lamp IL corresponding to the serial number of the calling telephone station T and the alarm AL are energized. Thus an operator in the calling office 20 can identify the serial number of the calling telephone station by noticing the energized alarm and seeing the energized lamp.

If the listener returns his transmitter and receiver unit to its normal position, the entire circuit returns to its reset position where it is ready for the succeeding operation.

It is noted that the identification device according to the invention is operated in response to only a listener responding to a call. Accordingly, even after a caller has stopped his transmission the present device can identify the number of his telephone station only through a dialling of the particular digit performed by the associated listener.

It has been found that the use of control and identification relays C and I having a time delay of 250 millisecond and a variable resistor VR having a resistance of 5 kilohms and a rating wattage of 1 watt provide a satisfactory result.

From the foregoing, it will be appreciated that the aforesaid objects of the invention have been accomplished by the provision of an identification device operable in response to a listener dialling a predetermined digit such as the digit "1." In addition, the present invention is equally applicable to any type of automatic telephone exchange system and also to any multioffice area.

While the invention has been shown and described in conjunction with a single preferred embodiment thereof, it is to be understood that various changes in the details of construction and the arrangement and combination of parts can be without departing from the spirit and scope of the invention. For example, the alarm AL has been described as being provided for each of calling telephone stations. However a single alarm may be common to several telephone stations having sets of contacts $l_{4'}$ and $i_{2'}$, $l_{4''}$ and $i_{2''}$, etc., as shown in FIG. 1.

What I claim is:

1. An identification device adapted to be connected in an automatic telephone exchange office to a telephone station to be identified and directly served by the exchange office, comprising first relay means responsive to an inversion of a calling line circuit due to a response in a called telephone station to a call from the calling telephone station for being actuated by the inversion of the calling line circuit, second relay means of the slow release type coupled to said first relay means and responsive to the actuation of said first relay means, third relay means of the slow release type coupled to the first relay means through the contacts of said second relay means and responsive to dialing of a predetermined digit in the called telephone station while said second relay means is energized, holding circuit means coupled to said third relay means for holding said third relay means energized, indication means coupled to and responsive to energizing of said third relay means to indicate that the calling telephone station has placed a call, and a source of current coupled to said second and third relays and said indication means, whereby the number of a calling station can be identified even after the calling station replaces the receiver.

2. An identification device as claimed in claim 1, wherein said indication means includes alarm means responsive to energizing of said third relay means.

3. An identification device adapted to be connected in an automatic telephone exchange office to a telephone station to be identified and directly served by the exchange office, comprising a listener relay responsive to an inversion of a calling line circuit due to a response in a called telephone station to a call from the calling telephone station for being actuated by the inversion of the calling line circuit, a variable resistor connected in series with said listener relay for setting the current flow at which said listener relay will be actuated, a source of direct current, a slow releasing control relay coupled to said source of current and coupled to and responsive to actuation of said listener relay to be energized and by said source, an identification relay coupled to said source of current and coupled to said listener relay through the control relay and responsive to dialing of a predetermined digit in the called station when said control relay is energized, a holding circuit connected with said identification relay for holding said identification relay in the energized condition, an indication lamp coupled to said identification relay to indicate that the calling telephone station to which the device is connected has placed a call, and an alarm connected to said identification relay and said source of current and energized when said identification relay is energized.

4. An identification device adapted to be connected in an automatic telephone exchange office to a telephone station to be identified and directly served by the exchange office, comprising a series connected variable resistor and listener relay adapted to be connected in parallel to a portion of the associated calling line circuit of the telephone station to be identified in the exchange office, said variable resistor being adapted to be set to permit said listener relay to be energized in response to an inversion of the associated calling line circuit, said listener relay having one side grounded and having a set of transfer contacts, a source of direct current, a slow releasing control relay connected across said source of current through the make side of said set of transfer contacts and including a set of make contacts, an identification relay connected across said source of current through said set of make contacts of said control relay and the break side of said set of transfer contacts of said listener relay, said listener relay further having a pair of sets of make contacts, said identification relay having a set of make contacts, a holding circuit including one of said sets of make contacts of said listening relay and said set of make contacts of said identification relay and connected to said identification relay to hold said identification relay energized, an indication lamp connected across said source of current through the other set of make contacts of said listener relay and the set of holding make contacts of said identification relay, each of said listener relay and said identification relay having an additional set of make contacts, and an alarm connected across said source of current through said two additional sets of make contacts, the arrangement being such that dialing of a predetermined digit in the called telephone station causes the device to indicate that the calling telephone station has made a call by energization of said indication lamp.

References Cited

UNITED STATES PATENTS

| | | |
|---|---|---|
| 3,147,344 | 9/1964 | Maxfield. |
| 3,015,698 | 1/1962 | Pedrick. |

KATHLEEN H. CLAFFY, Primary Examiner

T. W. BROWN, Assistant Examiner